United States Patent [19]

Ackroyd

[11] Patent Number: 5,072,753

[45] Date of Patent: Dec. 17, 1991

[54] TOGGLE LINKAGE CHECK VALVE

[75] Inventor: Rand H. Ackroyd, Methuen, Mass.

[73] Assignee: Watts Regulator Company, Lawrence, Mass.

[21] Appl. No.: 644,434

[22] Filed: Jan. 22, 1991

[51] Int. Cl.⁵ ............................................. F16K 15/03
[52] U.S. Cl. ..................................... 137/527; 251/337
[58] Field of Search .................. 137/527, 527.2, 527.4, 137/527.6; 251/298, 303, 337

[56] References Cited

U.S. PATENT DOCUMENTS

| | | | |
|---|---|---|---|
| 1,871,536 | 8/1932 | LeBus | 137/527 X |
| 2,515,425 | 7/1950 | Restemeier | 137/527 X |
| 2,556,277 | 6/1951 | Hill et al. | 137/527 X |
| 2,626,124 | 1/1953 | McCarthy | 251/134 |
| 2,748,788 | 6/1956 | Duckstein | 137/527 X |
| 3,026,902 | 3/1962 | Ruhl, Jr. | 137/527 X |
| 3,313,458 | 4/1967 | Braun | 222/402.13 |
| 3,482,603 | 12/1969 | Outcalt | 136/515.5 |
| 3,604,453 | 9/1971 | Boltnott | 137/527 |
| 3,789,874 | 2/1974 | Hills | 137/527 |
| 3,817,273 | 6/1974 | Erwin, Jr. | 137/338 |
| 3,857,408 | 12/1974 | Rhodes et al. | 137/514 |
| 3,974,848 | 8/1976 | Wheatley | 137/102 |
| 3,996,962 | 12/1976 | Sutherland | 137/527.4 |
| 4,019,532 | 4/1977 | Schittek | 137/527 |
| 4,067,356 | 1/1978 | Kreuz | 137/527 |
| 4,569,636 | 2/1986 | Bauer et al. | 417/295 |
| 4,596,248 | 6/1986 | Lieberman | 128/207.16 |
| 4,989,635 | 2/1991 | Dunmire | 137/527 |

OTHER PUBLICATIONS

"Check Valves", Ames (brochures), date unknown.
"Dual Function Swing Check Valves", Merit Manufacturing Corporation (brochure), date unknown.

Primary Examiner—John Rivell
Attorney, Agent, or Firm—Fish & Richardson.

[57] ABSTRACT

A toggle linkage check valve including a housing having an inlet and an outlet and a sealing plug disposed within the housing and adapted for movement between a first, closed position for preventing flow of liquid between the inlet and the outlet, and a second, open position for substantially permitting flow of liquid between the inlet and the outlet. The check valve includes a spring assembly removably disposed within the housing. The sealing plug is mounted upon the spring assembly. The spring assembly includes a rod member and a means for biasing the rod member toward the sealing plug. In the first position of the sealing plug, the rod member lies substantially perpendicular to a plane of the sealing member across the inlet, and in the second position of the sealing plug, the rod member lies at an acute angle to the plane of the sealing member. The means for biasing acts upon the rod member to apply, to the sealing plug, a biasing force of a second degree less than the first degree, whereby the spring assembly acts upon the sealing plug to provide a maximum resistance against liquid flow from the inlet toward the outlet when the sealing plug is in the first, closed position and a lesser resistance against liquid flow when the sealing plug is in the second, open position.

9 Claims, 5 Drawing Sheets

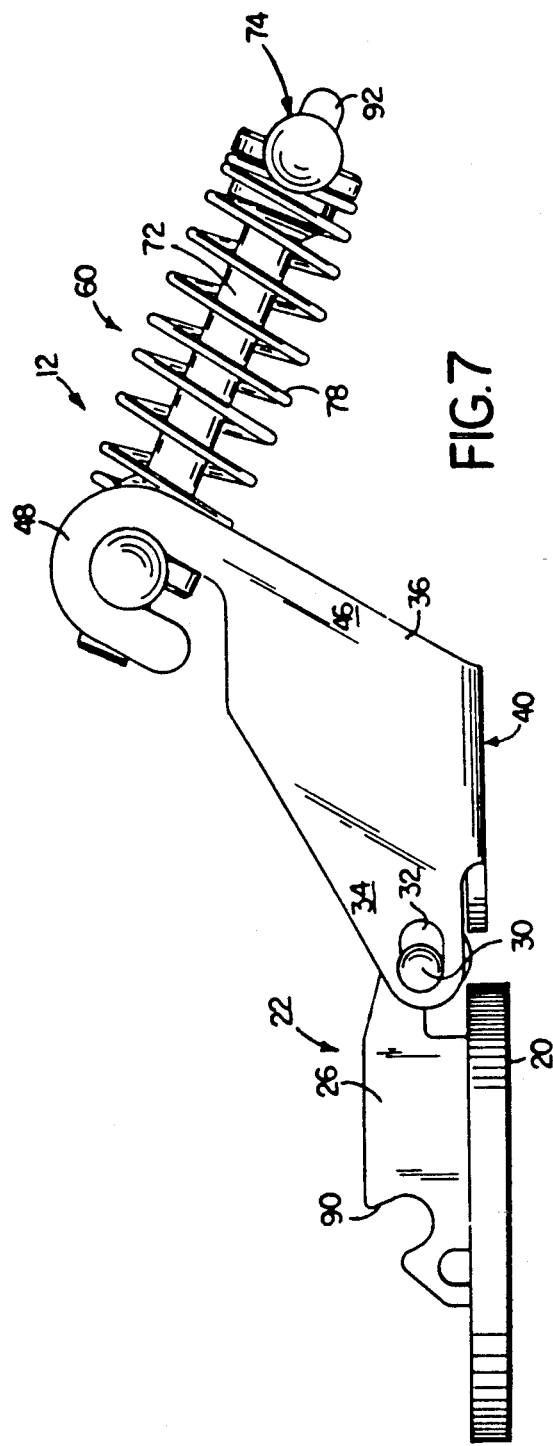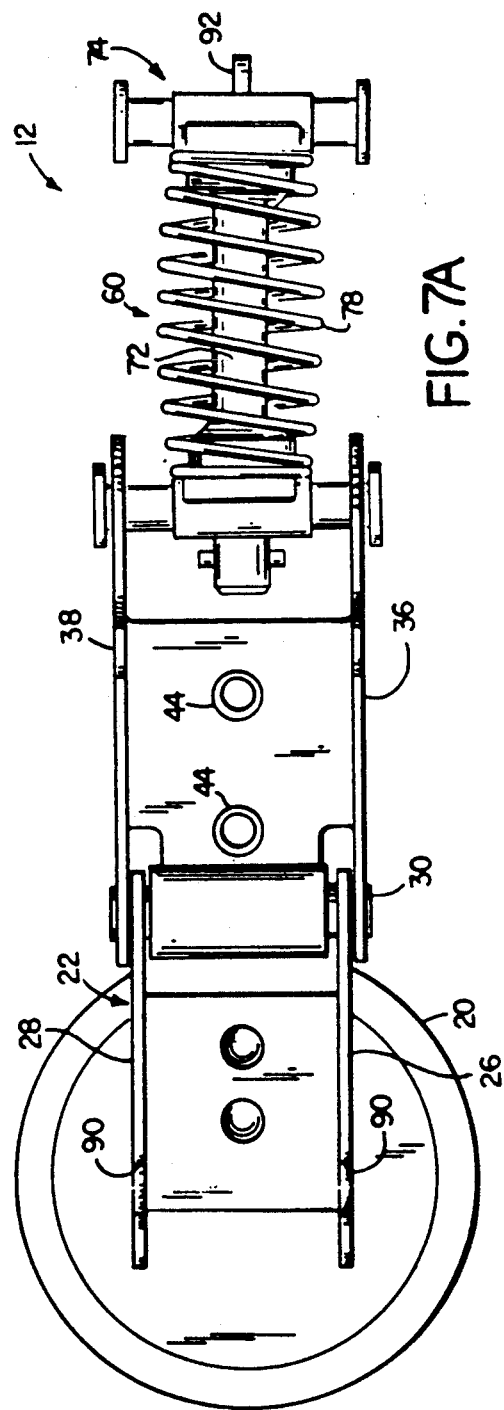

TOGGLE LINKAGE CHECK VALVE

BACKGROUND OF THE INVENTION

The invention relates to check valves and more particularly to valves for preventing back flow.

Check valves are provided in a conduit system to prevent the backwards flow of liquid, e.g. in the event of a reduction or reversal of a supply pressure. In a typical water piping system in a home or other building, check valves are used to prevent back flow of potentially contaminated water from the building water system (e.g. water from a wash tub containing detergent or other cleaning agents, or water from a lawn or garden hose contaminated with fertilizer or other chemicals) into the water main, as may occur, e.g., due to a sudden loss of pressure in the water main. Different valve systems have been designed for the purpose of assuring that a drop in supply pressure will result in the closing of the check valve in order to prevent back flow.

In one prior art back flow valve, the sealing plug is weighted to bias the valve toward the closed position. Forward flow of a liquid under normal pressure forces the valve into open position, but upon pressure reduction the weight aids in closing the valve. A weight biased valve typically does not close quickly enough to avoid flow reversal which slams the valve shut and creating a noisy hammering sound.

Referring to FIG. 1, another prior art check valve 1 has a sealing plug 2 mounted upon a scissor assembly 4. Springs 6 are attached at both sides of the scissor assembly 4 between the scissor hinge arms 8, 8' which are generally perpendicular to the plane P of the sealing plug 2 in closed position. The springs are disposed generally at a 45 degree angle to the flow of liquid, the bias of springs 6 serving to urge the scissor assembly 4 toward a compressed configuration, thereby forcing the sealing plug 2 against the inlet 9 to positively close the valve. The forward flow of a liquid (arrow F) under normal pressure opens the valve.

SUMMARY OF THE INVENTION

In one aspect, the invention is a toggle linkage check valve including a housing having an inlet and an outlet and a sealing plug disposed within the housing and adapted for movement between a first, closed position for preventing flow of liquid between the inlet and the outlet, and a second, open position for substantially permitting flow of liquid between the inlet and the outlet. The check valve includes a spring assembly removably disposed within the housing. The sealing plug is mounted upon the spring assembly. The spring assembly includes a rod member and a means for biasing the rod member toward the sealing plug. In the first position of the sealing plug, the rod member lies substantially perpendicular to a plane of the sealing member across the inlet, and in the second position of the sealing plug, the rod member lies at an acute angle to the plane of the sealing member. The means for biasing acts upon the rod member to apply, to the sealing plug, a biasing force of a second degree less than the first degree, whereby the spring assembly acts upon the sealing plug to provide a maximum resistance against liquid flow from the inlet toward the outlet when the sealing plug is in the first, closed position and a lesser resistance against liquid flow when the sealing plug is in the second, open position.

One feature of the toggle linkage check valve is that the spring assembly further includes a bracket positioned within the housing, the bracket having an inlet facing portion and an outlet facing portion. The sealing plug is rotatably attached to the inlet facing portion of the bracket and the spring assembly is located between the outlet facing portion of the bracket and the sealing plug.

Another feature of the toggle linkage check valve is that the spring assembly is detachable from the sealing plug.

Still another feature of the toggle linkage check valve is that the spring assembly is rotatably attached to the bracket.

Yet another feature of the toggle linkage check valve is that the spring assembly is detachable from the bracket.

Still yet another feature of the toggle linkage check valve is that the spring assembly is rotatably attached to the sealing plug.

Another feature of the toggle linkage check valve is that the spring assembly is detachable from the sealing plug and is detachable from the bracket.

Still another feature of the toggle linkage check valve is that the spring assembly includes a forward toggle member and a rear toggle member each having one set of two toggle extensions, a rod, upon which one of the toggle members is slidably attached and the other of the toggle members is fixedly attached, and a compression spring, coaxial with the rod and located between the forward and rear toggle assemblies.

Another aspect of the invention is a toggle linkage check valve including a housing with an inlet and an outlet, and a bracket, having an inlet facing portion and an outlet facing portion, the bracket located within and fixedly attached to the housing and including a curved spring assembly retaining member on the outlet facing portion. The toggle linkage check valve further includes a sealing plug, located inside the housing, having a closed position, wherein the sealing plug prevents flow between the inlet and the outlet, and an open position, wherein the sealing plug substantially permits flow between the inlet and the outlet, and an arm, having a first end fixedly attached to the sealing plug and a second end rotatably attached to the bracket. The arm includes toggle retaining notches on a side of the arm opposite the sealing plug and between the first end and the second end. The toggle linkage check valve also includes a spring assembly including a forward toggle member and a rear toggle member each having one set of two toggle extensions, the sets of toggle extensions defining a plane, a nipple attached to the front of the forward toggle member, and a rod, to which the forward toggle member is fixedly attached and upon which the rear toggle member is slidably mounted. The rod is oriented perpendicular to the plane of the toggle extensions. The toggle linkage check valve further includes a pin mounted to the outlet facing end of the rod, to prevent the rear toggle member from sliding from the rod and a spring, located between the forward and rear toggle assemblies and coaxial to the rod, the spring biasing the rear toggle member toward the pin. The forward toggle member is adapted for engagement with the toggle retaining notches such that the nipple presses against the center of an outlet facing surface of the sealing plug. The rear toggle member is adapted for the engagement of the curved spring assembly retaining member on the outlet facing portion of the bracket. The toggle linkage check valve is constructed whereby when the pressure of a liquid at the inlet exceeds a predetermined pressure, the sealing plug moves from the closed position thereby permitting flow between the inlet and said outlet.

DESCRIPTION OF A PRESENTLY PREFERRED EMBODIMENT

We first briefly describe the drawings.

Figure 1:
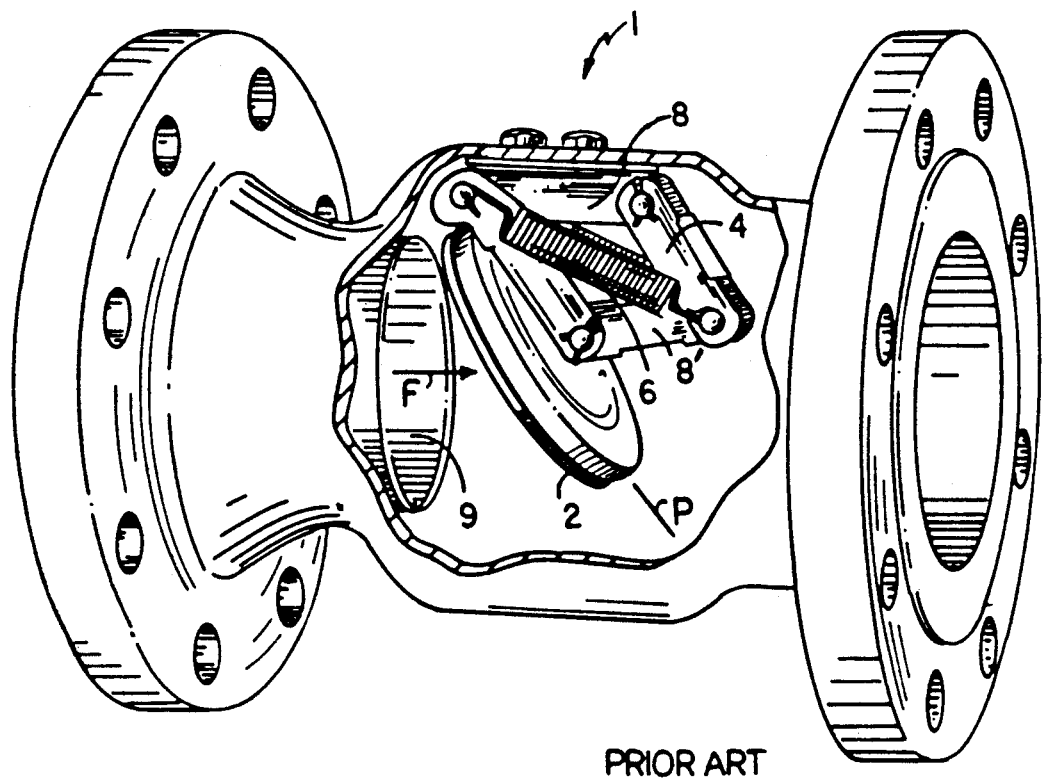
FIG. 1 is a somewhat diagrammatic side section view of a prior art check valve.
Figure 2:
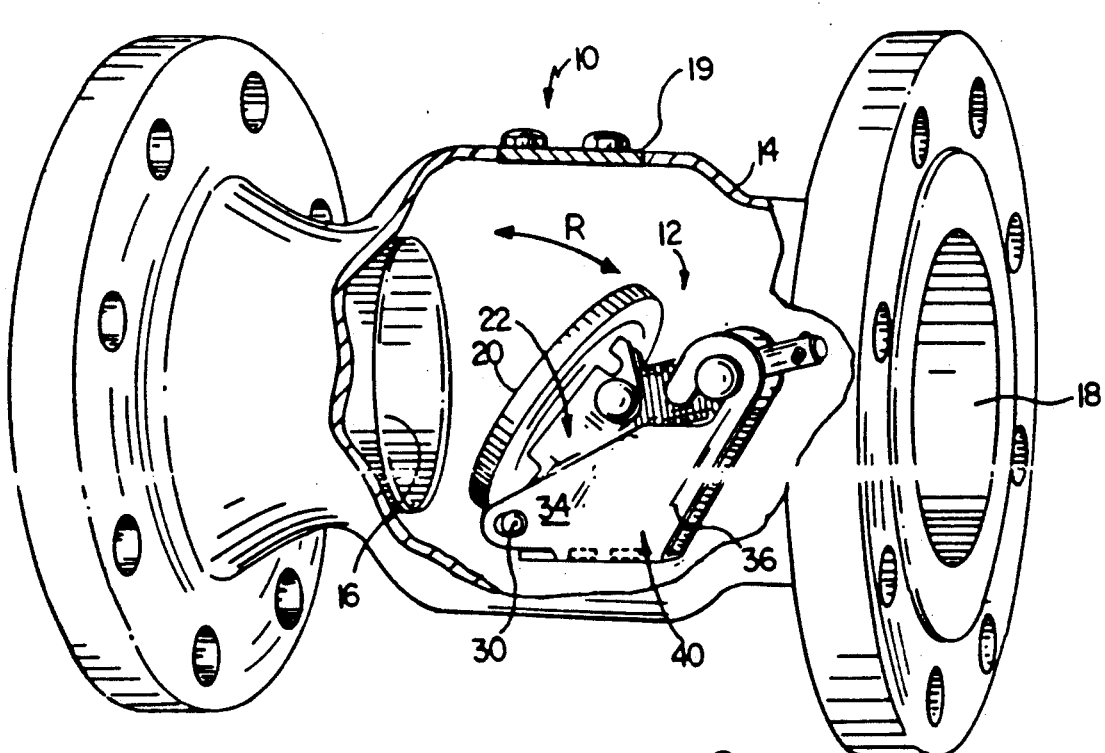
FIG. 2 is a similar view of a toggle linkage check valve of the invention.
Figure 8:
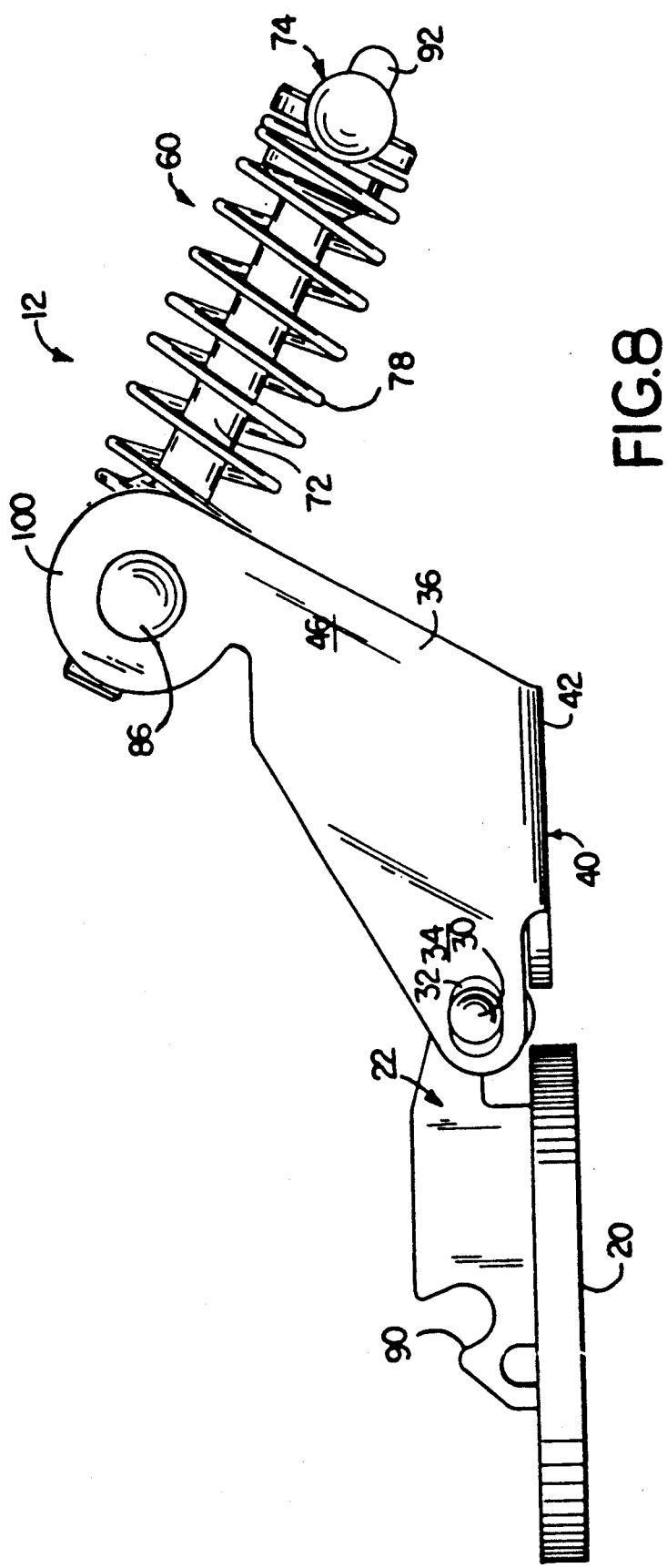

FIG. 7 is a side view of the toggle linkage check valve of FIG. 2 in front uncoupled position; FIG. 7a is a top view of the bracket of the check valve with the spring assembly in the uncoupled as in FIG. 7; and FIG. 8 is a similar view of another embodiment of the toggle linkage check valve of the invention in front uncoupled position, with the rear toggle fixably and rotatably attached to the curved spring assembly retaining portion.

Figure 3:
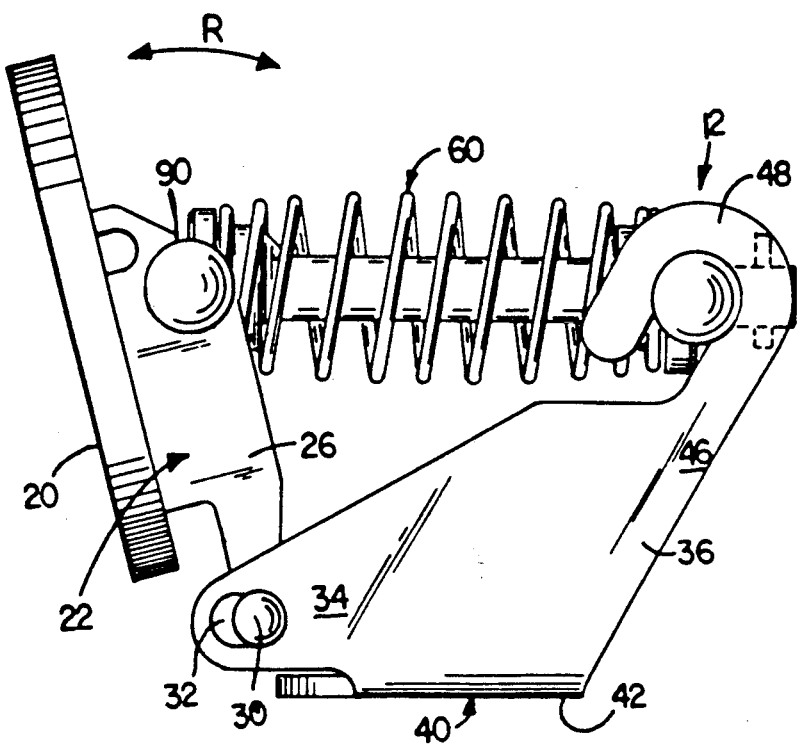
FIG. 3 is a side view of the check valve element of the embodiment of FIG. 2 in closed position.
Figure 4:
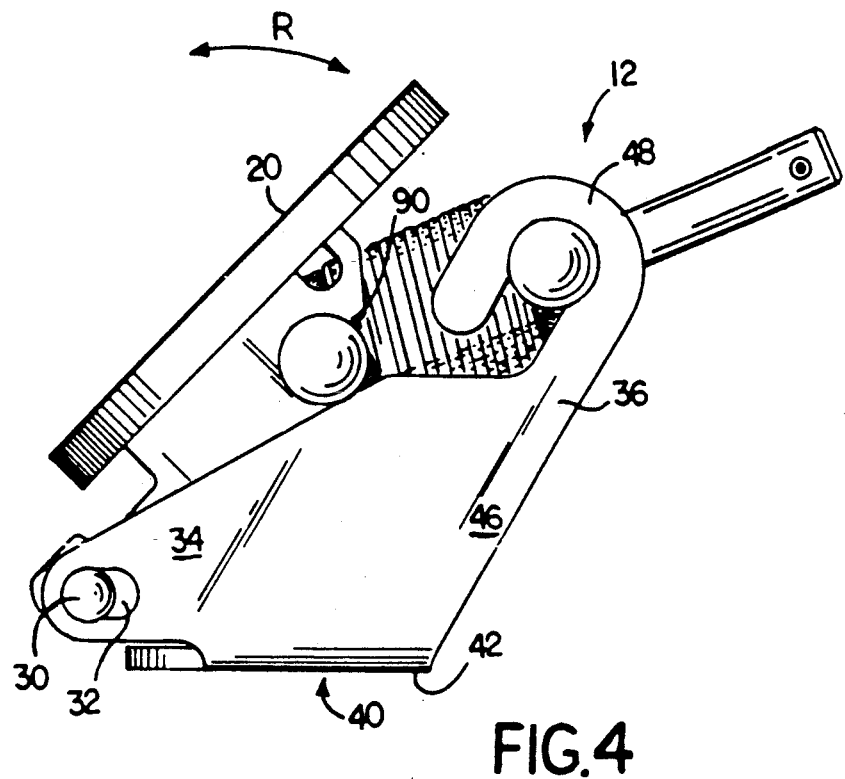
FIG. 4 is a similar view of the check valve element of FIG. 3 in open position.

Referring to FIG. 2, a toggle linkage check valve 10 of the invention consists of a check valve assembly 12 mounted within a housing 14. The housing 14 defines an inlet 16 and an outlet 18, and the check valve assembly 12 is positioned adjacent the inlet 16. The housing 14 also includes an access cover 19 which permits access to the check valve assembly 12. The check valve assembly is mounted in a manner such that flow of liquid is substantially unimpeded in the direction from inlet 16 toward outlet 18, but prevented from flowing in the reverse direction from outlet 18 toward inlet 16. Referring now also to FIGS. 3 and 4, the check valve assembly 12 consists of a sealing plug 20 mounted at the inlet end of an arm 22. The arm 22 is rotatably mounted at the inlet end 34 of a mounting bracket 40. The rotatable attachment is obtained by alignment of slots in both sides of the outlet end of arm 22, with slots 32 in both sides 36, 38 of the inlet end 34 of the mounting bracket 40. The outlet end of arm 22 rides upon a roller bearing 30 located between the sides 36, 38 of the mounting bracket 40, the ends of the roller bearing 30 resting within the slots of the mounting bracket. The combination of arm 22 and roller bearing 30 permits the sealing plug 20 of the check valve assembly 12 to rotate (arrow R) between a first closed position (FIG. 3) and a second open position (FIG. 4). In closed position, the sealing plug 20 is engaged against the inlet 16 to prevent flow of liquid through the valve 10. In open position, the sealing plug 20 is displaced from the inlet 16 to permit flow of liquid.

The mounting bracket 40 has a base portion 42 through which extend two tapped mounting holes 44 by which the mounting bracket 40 is secured to the housing 14. The outlet end 46 of both sides 36, 38 of the mounting bracket 40 includes a curved spring assembly retaining portion 48, about which more will be said shortly.

Figure 5:
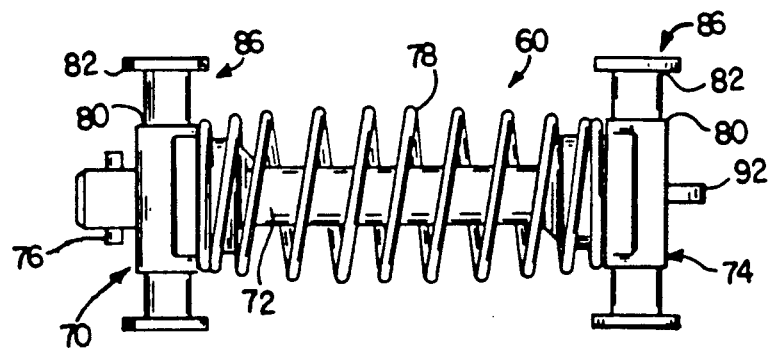
FIGS. 5 and 5a are top and side views respectively of the spring assembly of the check valve of FIG. 2.
Figure 5A:
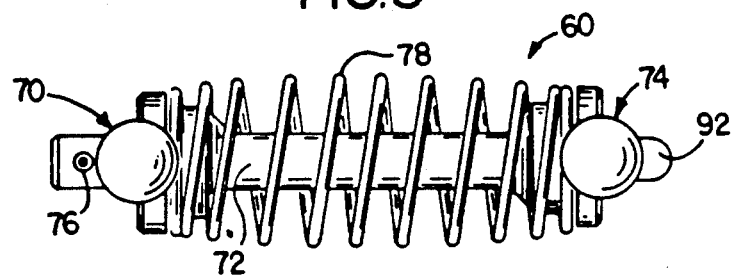

The sealing plug 20 is biased toward the closed position against the inlet 16 by action of spring assembly 60. Referring now also to FIGS. 5 and 5A, the spring assembly 60 includes a forward toggle member 74 fixedly attached at one end of a rod 72. A rear toggle member 70 is slidably mounted on the rod 72 and retained by a retaining pin 76. A compression spring 78 is disposed about the rod 72 and retained between the forward toggle member 74 and the rear toggle member 70. The spring 78 biases the rear toggle member 70 toward the retaining pin 76.

Toggle members 70, 74 are each generally cylindrical in shape and include a toggle extension 86 consisting of an inner retaining edge 80 and an outer retaining lip 82 at each end of the cylinder. The curved spring assembly retaining portion 48 of each side 36, 38 of the mounting bracket 40 engages between the inner retaining edge 80 and the outer retaining lip 82 of the corresponding side of the rear toggle member 70, thereby centering the rear toggle member 74 between the two curved spring assembly retaining portions 48.

The inlet end of the arm 22 has two sides 26, 28, each defining toggle retaining notches 90. The forward toggle member 74 engages each of the toggle retaining notches 90 between the inner retaining edge 80 and the outer retaining lip 82. A centering nipple 92 located on the forward toggle member 74 and along the axis of rod 72 rests against the outlet facing surface of the sealing plug 20.

The forward toggle member 74 working through the arm 22 and centering nipple 92 acts as the main point of contact between the sealing plug 20 and the spring assembly 60, as is shown in FIG. 3. When the sealing plug 20 is in closed position, the points of contact between the spring assembly 60 and the sealing plug 20 allow the spring 78 to bias the sealing plug 20 toward the closed position and provide resistance against a liquid pressure from the inlet 16. Referring to FIG. 4, when the liquid pressure is sufficient to overcome the resistance of the spring assembly 60, the sealing plug 20 is moved backwards and downwards, forcing the rod 72 to slide through the rear toggle assembly 70. The sealing plug 20 is prevented from further backwards or downwards movement by engagement of the forward toggle member 74 against the mounting bracket 40. In this position, liquid is allowed to flow relatively unimpeded from the inlet 16 toward the outlet 18.

When the liquid pressure falls below a predetermined level, the spring assembly 60 forces the sealing plug 20 upwards and forwards, as the sealing plug 20 assumes a closed position to seal the inlet 16. The closing of the inlet 16 prevents a back flow of liquid from occurring.

Figure 6:
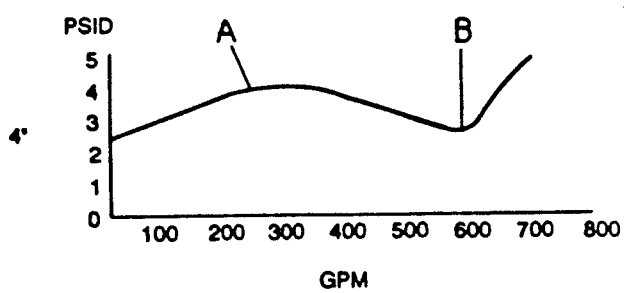
FIGS. 6, 6a and 6b are plots of pressure versus liquid flow for a toggle linkage check valve of the invention, FIG. 6 relating to operation of a 4 inch radius sealing plug, FIG. 6A relating to operation of a 6 inch radius sealing plug and FIG. 6B relating to operation of an 8 inch radius sealing plug.
Figure 6A:
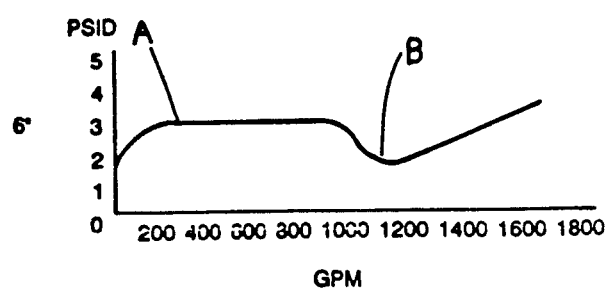
Figure 6B:
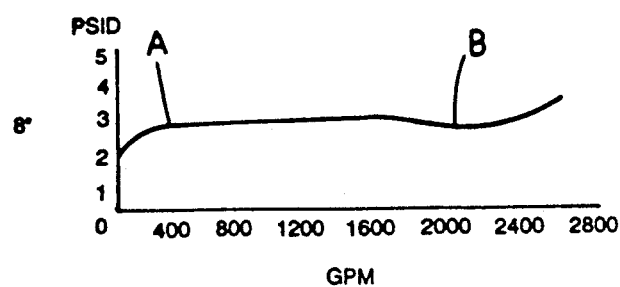

Referring to FIGS. 6, 6A, 6B, the plots show pressure versus flow rate for different size toggle linkage check valves of the invention. The spring assembly 60 acts upon the sealing plug 20 and provides maximum resistance against the flow of liquid through the inlet 16 when the sealing plug 20 is in closed position (designated on the graph by the letter 'A'). A minimum resistance against the flow occurs when the sealing plug is in open position (designated on the graph by the letter 'B').

If repair or replacement of the toggle linkage check valve 10 is required, the spring assembly 60 is easily uncoupled from the sealing plug 20 and, if necessary, may be entirely uncoupled from the remaining portion of the toggle linkage check valve 10 as follows. First, the access cover 18 is removed, permitting access to the check valve 12 through the housing 14. Second, the forward toggle member 74 is forced backwards to compress the spring 78 and forced up and out of the toggle retaining notches 90, until the forward toggle assembly is uncoupled from the arm 22 (FIGS. 7 and 7a). Referring to FIGS. 5, 5A, if the spring assembly 60 needs to be entirely uncoupled, the rear toggle member 70 is slid down and out from between the curved spring assembly, retaining portions 48, after the forward toggle member 74 has already been uncoupled.

Referring now to FIG. 8, in another embodiment of the invention, the rear toggle extensions 86 are rotatably but not removably attached to the curved spring assembly retaining portions 100. The spring assembly can either be fixably attached to the curved spring assembly retaining portions 100 or to the toggle retaining notches, or removably and rotatably attached to both.

The foregoing description has been limited to a specific embodiment of this invention. It will be apparent, however, that variations and modifications may be made to the invention with the attainment of some or all of the advantages of the invention. Therefore, it is the object of the appended claims to cover all such variations of and modifications as come within the true spirit and scope of the invention.

What is claimed is:

1. A toggle linkage check valve comprising:
   a housing having an inlet and an outlet;
   a sealing plug disposed within said housing and adapted for movement between a first, closed position for preventing flow of liquid between said inlet and said outlet, and a second, open position for substantially permitting flow of liquid between said inlet and said outlet; and
   a spring assembly removably disposed within said housing, said sealing plug mounted upon said spring assembly, said spring assembly comprising a rod member and a means for biasing said rod member toward said sealing plug,
   in said first position of said sealing plug, said rod member lying substantially perpendicular to a plane of said sealing member across said inlet, and
   in said second position of said sealing plug, said rod member lying at an acute angle to said plane of said sealing member, with said means for biasing acting upon said rod member to apply, to said sealing plug, a biasing force of a second degree less than said first degree, whereby said spring assembly acts upon said sealing plug to provides a maximum resistance against liquid flow from said inlet toward said outlet when said sealing plug is in said first, closed position and a lesser resistance against liquid flow when said sealing plug is in said second, open position.

2. The toggle linkage check valve of claim 1 wherein said spring assembly further comprises a bracket positioned within said housing, said bracket having an inlet facing portion and an outlet facing portion, said sealing plug being rotatably attached to said inlet facing portion of said bracket and said spring assembly being located between said outlet facing portion of said bracket and said sealing plug.

3. The toggle linkage check valve of claim 2 wherein said spring assembly is detachable from said sealing plug.

4. The toggle linkage check valve of claim 3 wherein said spring assembly is rotatably attached to said bracket.

5. The toggle linkage check valve of claim 2 wherein said spring assembly is detachable from said bracket.

6. The toggle linkage check valve of claim 5 wherein said spring assembly is rotatably attached to said sealing plug.

7. The toggle linkage check valve of claim 2 wherein said spring assembly is detachable from said sealing plug and is detachable from said bracket.

8. The toggle linkage check valve of claim 1 wherein said spring assembly comprises:
   a forward toggle member and a rear toggle member each having one set of two toggle extensions;
   a rod, upon which one of said toggle members is slidably attached and the other of said toggle members is fixedly attached; and
   a compression spring, coaxial with said rod and located between said forward and rear toggle assemblies.

9. A toggle linkage check valve comprising:
   a housing with an inlet and an outlet;
   a bracket, having an inlet facing portion and an outlet facing portion, said bracket located within and fixedly attached to said housing, said bracket including a curved spring assembly retaining member on said outlet facing portion;
   a sealing plug, located inside said housing, having a closed position, wherein said sealing plug prevents flow between said inlet and said outlet, and an open position, wherein said sealing plug substantially permits flow between said inlet and said outlet;
   an arm, having a first end fixedly attached to said sealing plug and a second end rotatably attached to said bracket, said arm including toggle retaining notches on a side of said arm opposite said sealing plug and between said first end and said second end;
   a spring assembly comprising:
   a forward toggle member and a rear toggle member each having one set of two toggle extensions, said sets of toggle extensions defining a plane;
   a nipple attached to the front of said forward toggle member;
   a rod, to which said forward toggle member is fixedly attached and upon which said rear toggle member is slidably mounted, said rod oriented perpendicular to the plane of said toggle extensions;
   a pin mounted to the outlet facing end of said rod, to prevent said rear toggle member from sliding from said rod; and
   a spring, located between said forward and rear toggle assemblies and coaxial to said rod, said spring biasing said rear toggle member toward said pin;
   said forward toggle member adapted for engagement with said toggle retaining notches such that said nipple presses against the center of an outlet facing surface of said sealing plug, said rear toggle member adapted for engagement of said curved spring assembly retaining member on said outlet facing portion of said bracket;
   whereby when the pressure of a liquid at said inlet exceeds a predetermined pressure, said sealing plug moves from said closed position thereby permitting flow between said inlet and said outlet.

* * * * *